United States Patent [19]

Buck et al.

[11] 4,070,566

[45] Jan. 24, 1978

[54] MARKER LAMP ASSEMBLY

[75] Inventors: Roel C. Buck, Sunderland; Peter E. Brudy, West Hill, both of Canada

[73] Assignee: Dominion Auto Accessories Limited, Toronto, Canada

[21] Appl. No.: 668,849

[22] Filed: Mar. 22, 1976

[51] Int. Cl.[2] .......... B60Q 1/32

[52] U.S. Cl. .......... 362/369; 362/390; 362/457; 339/221 L

[58] Field of Search .......... 240/8.2, 7.1 R, 8.1 R, 240/8.3, 57, 90, 153; 339/221 L

[56] References Cited

U.S. PATENT DOCUMENTS

| | | | |
|---|---|---|---|
| 3,096,026 | 7/1963 | Bruce et al. | 240/90 X |
| 3,145,933 | 8/1964 | Dickson | 240/8.2 |

*Primary Examiner*—Richard A. Wintercorn

*Attorney, Agent, or Firm*—Barnes, Kisselle, Raisch & Choate

[57] ABSTRACT

A lamp assembly comprising a lens, a housing assembly including a base, and a resilient mounting member fixed on the base. The resilient mounting has a central portion spaced from said base and having a centrally located opening therein. The opening having at least a portion thereof extending away from the center. A socket base is provided which has a planar surface and a centrally located projection with at least one laterally extending portion spaced from said planar surface of the base such that said base is mounted on the resilient mounting member by inserting the projection through said opening and rotating the base relative to the shock mount to bring the laterally extending portion thereof beneath the central portion of the resilient mounting member.

11 Claims, 7 Drawing Figures

MARKER LAMP ASSEMBLY

This invention relates to marker lamp assemblies.

BACKGROUND OF THE INVENTION

In lamp assemblies which are used with automotive vehicles, it has become necessary to mount the bulb resiliently in order to minimize the damage to the bulb due to vibration. A typical construction is shown in the U.S. Pat. No. 3,222,512.

Prior constructions, such as that shown in U.S. Pat. No. 3,222,512, have the common fault of cumbersome assembly. In such devices, it has proven virtually impossible to automate the assembly operation due to the structural design. The specific reference noted involves an operation whereby the shock isolating member must be "scraped" through the socket housing. The present invention describes this fault by facilitating an assembly whereby a "truss & lock" arrangement is utilized.

Among the objects of this invention are to provide an improved lamp assembly providing shock resistance mounting which is easily assembled, relatively simple in construction, provides a minimum of vibration to the bulb in use, and incorporates parts that are easily made.

SUMMARY OF THE INVENTION

In accordance with the invention, the shock mounting member has a central portion spaced from the base of the housing and having a central portion with a centrally located opening therein, said opening having at least a portion thereof extending away from the center. A socket base is provided which has a planar surface and a centrally located projection with at least one laterally extending portion spaced from said planar surface of the socket base such that the socket may be mounted on the resilient mounting member inserting the projection through said opening and rotating the socket base relative to the shock mount to bring the laterally extending portion thereof beneath the central portion of the resilient mounting member.

DESCRIPTION

Figure 1:
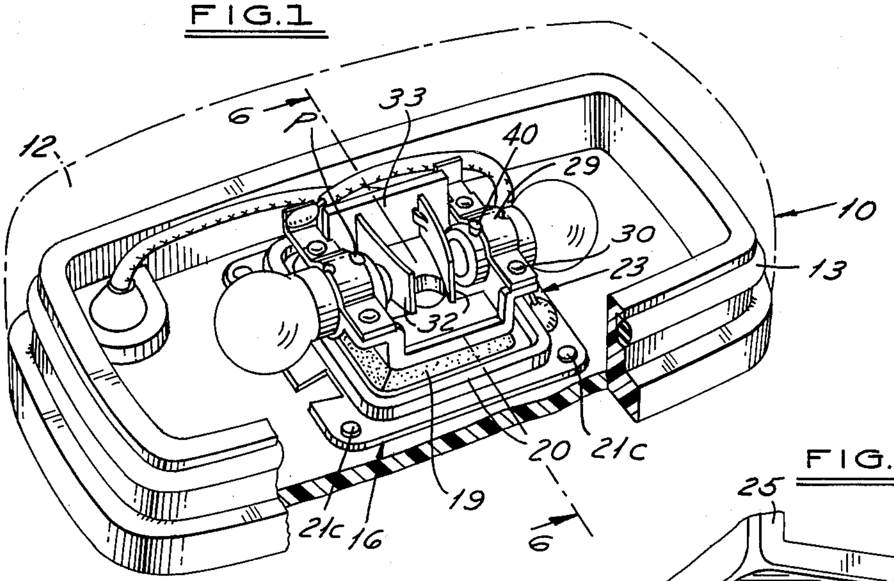
FIG. 1 is a part sectional perspective view of a marker lamp assembly embodying the invention.
Figure 3:
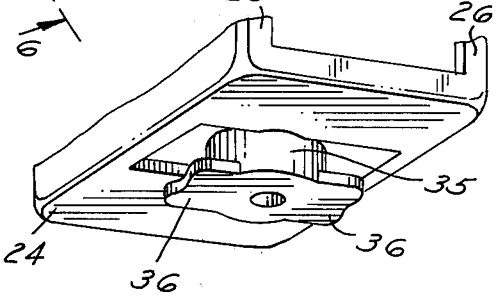
FIG. 3 is a fragmentary bottom perspective view of a part shown in FIG. 2.
Figure 2:
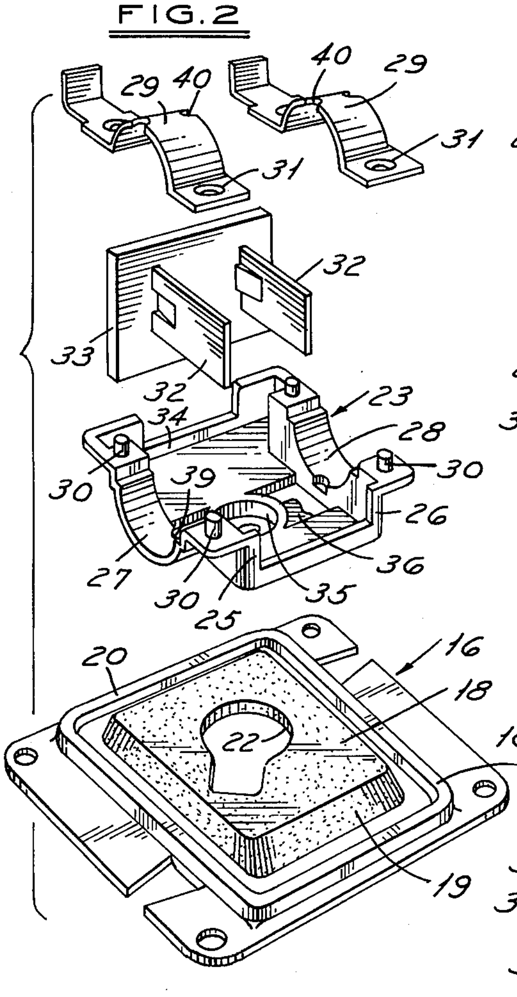
FIG. 2 is an exploded view of portions of the assembly shown in FIG. 1.
Figure 6:
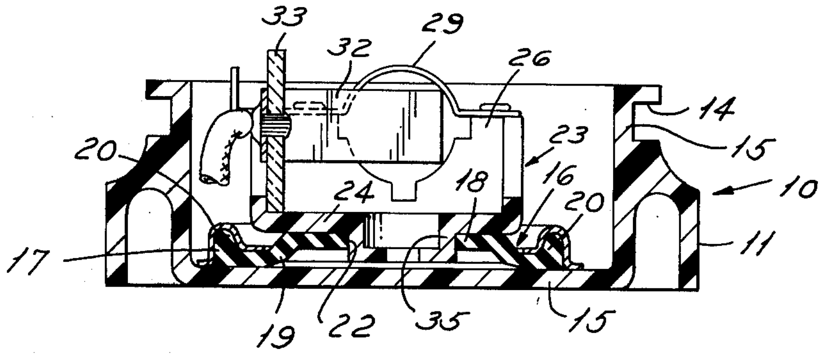
FIG. 6 is a sectional view taken along the line 6—6 in FIG. 1.

Referring to FIGS. 1 and 6, the marker lamp assembly 10 embodying the invention comprises a housing 11 and a removable lens 12 retained in position by an O-ring 13 that engages a groove 14 in the housing and the complementary groove in the lens.

Figure 4:
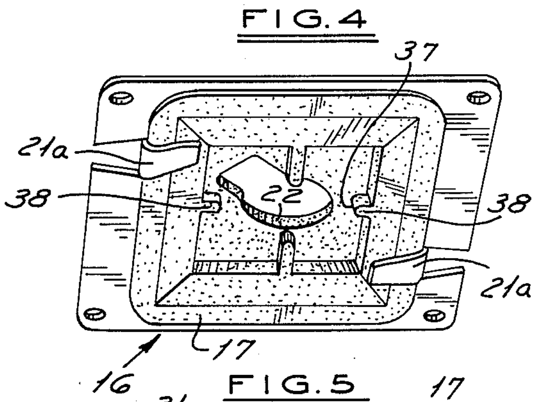
FIG. 4 is a bottom perspective view of another part shown in FIG. 2.
Figure 5:
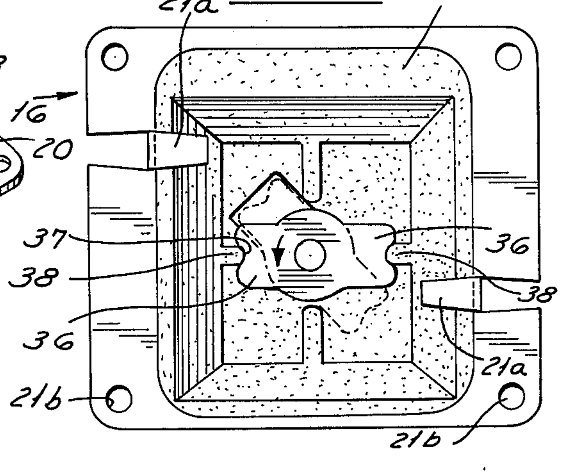
FIG. 5 is a bottom plan view of a portion of the assembly.
Figure 7:
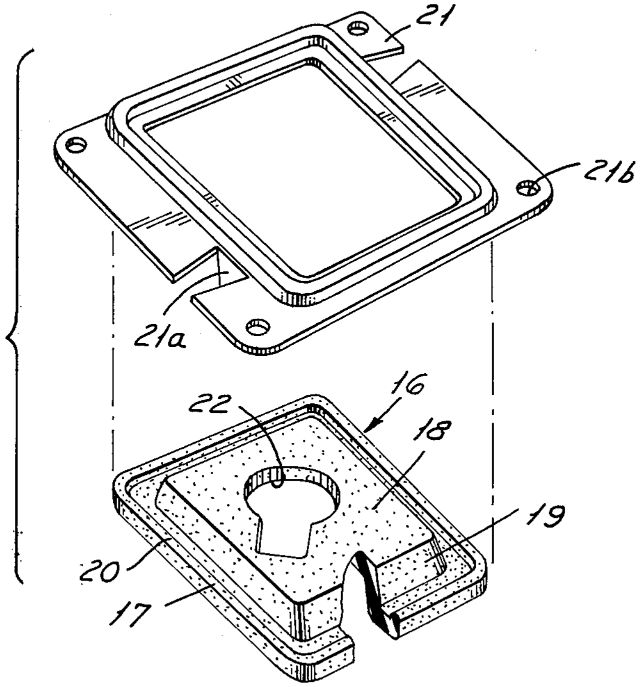
FIG. 7 is an exploded view of the subassembly shown in FIGS. 4 and 5.

The housing 10 includes a base wall 15 and a peripheral wall 15*a*. The base wall 15 has a substantially flat upper surface. A resilient mounting member 16 of resilient material such as polyvinylchloride having a durometer of 55–65 is mounted on the upper surface of the bottom wall 15. The resilient mounting member 16 includes a peripheral flange 17 that engages the upper surface of the wall 15 and a central substantially planar portion 18 of substantially uniform thickness connected to the flange portion by an inclined portion 19. The flange 17 is formed with a raised bead 20 and a complementary retaining plate 21 engages the flange 17. The resilient mounting member 16 and plate 21 are connected to one another by tabs 21a on plate bent about the flange 17 to form a subassembly (FIGS. 4, 5, 7). Projections 21*b* on wall 15 extend through openings 21*c* on plate 21 and the lids of projections 21*b* are deformed to retain the subassembly on base wall 15.

The central portion 18 of the resilient mounting member 16 has an opening 22 that is key shaped with the center of the circular portion of the opening at the center of the central portion 18.

A plastic socket base 23 includes a bottom wall 24 and end walls 25, 26 having semi-circular socket receiving portions 27, 28. The socket for the bulb is completed by clamps 29 that are fastened to the socket base 23 by deforming projections 30 that extend through openings 31 in the clamps 29. Electrical contact is made through contact members 32 mounted on a fiber board 33 that extends into a groove 34 in the socket base.

The surface of bottom wall 24 of the socket base 23 is planar and an integral projection 35 extends downwardly therefrom and has oppositely directed ears 36. The distance between the upper surface of ears 36 and the under surface of socket base 23 is substantially equal to the thickness of portion 18 of socket mount member 16.

The socket base 23 is positioned on the resilient mounting member 16 by inserting the projection 35 through the opening 22 as shown in broken lines in FIG. 5 and thereafter rotating the base to bring the recesses 37 in the ends of the projection 36 into engagement with the ends of ribs 38 formed on the undersurface of the resilient mounting member 16. In this manner the socket base 23 is maintained against rotation with respect to the resilient mounting member 16. Electrical connections to the bulbs are provided through appropriate wires, the bulbs being inserted through the opening formed by the clamps 29 and recesses 27, 28 and rotated to bring the pins P into engagement with recesses 39, 40.

We claim:

1. In a lamp assembly, the combination comprising
a lens,
a housing assembly including a base,
a mounting member
means for fixing said mounting member on said base,
said mounting member having a central resilient portion spaced from said base,
said central portion having a centrally located opening therein,
said opening having at least a portion thereof extending radially away from the center,
a socket base,
said base having a planar surface and a centrally located projection,
said projection having at least one laterally extending portion spaced from said planar surface of said base such that said base may be mounted on said central portion of said mounting member by inserting said projection through said opening with the laterally extending projection passing through the radially extending portion of said opening and rotating said base relative to said mounting member to bring the laterally extending portion thereof beneath the central portion of the mounting member.

2. The combination set forth in claim 1 including means integral with and on the underside of said central portion of said mounting member for engaging said projection to circumferentially locate said base with respect to the said mounting member.

3. The combination set forth in claim 2 wherein said projection has opposed laterally extending portions.

4. The combination set forth in claim 1 wherein said means for fixing said mounting member on said base of said housing comprises a retainer plate.

5. The combination set forth in claim 1 wherein the distance between the upper surface of said laterally projecting portion and the planar surface of said base is substantially equal to the thickness of said central portion of said mounting member.

6. In a lamp assembly, the combination comprising a lens, a housing assembly including a base, a resilient mounting member, means for fixing said mounting member on said base, said mounting member having a central portion spaced from said base, said central portion having a centrally located opening therein, said opening having at least a portion thereof extending radially away from the center, a socket base, said base having a planar surface and a centrally located projection, said projection having opposed laterally extending ears spaced from said planar surface of said base such that said base may be mounted on said mounting member by inserting said projection through said opening with said ears passing through the radially extending portions of said opening and rotating said base relative to said mounting member to bring the laterally extending ears thereof beneath the central portion of the mounting member.

7. The combination set forth in claim 6 including means integral with and on the underside of said central portion of said mounting member for engaging said ears to circumferentially locate said base with respect to the said mounting member.

8. The combination set forth in claim 7 wherein said means for fixing said mounting member on said base of said housing comprises a retainer plate.

9. The combination set forth in claim 8 wherein said distance between the upper surface of said ears and the planar surface of said base is substantially equal to the thickness of said central portion of said mounting member.

10. The combination set forth in claim 8 including means for connecting said retainer plate and said resilient mounting member to form a subassembly.

11. In a lamp assembly, the combination comprising a housing assembly including a base, a resilient mounting member, means for fixing said mounting member on said base, said mounting member having a central portion spaced from said base, said central portion having a centrally located opening therein, said opening having at least a portion thereof extending radially away from the center, a socket base, said base having a planar surface and a centrally located projection, said projection having opposed laterally extending ears spaced from said planar surface of said base such that said base may be mounted on said mounting member by inserting said projection through said opening with said ears passing through the radially extending portions of said opening and rotating said base relative to said mounting member to bring the laterally extending ears thereof beneath the central portion of the mounting member.

* * * * *